(12) United States Patent
Mannarswamy et al.

(10) Patent No.: US 8,453,132 B2
(45) Date of Patent: May 28, 2013

(54) SYSTEM AND METHOD FOR RECOMPILING CODE BASED ON LOCALITY DOMAIN AND THREAD AFFINITY IN NUMA COMPUTER SYSTEMS

(75) Inventors: Sandya S. Mannarswamy, Bangalore (IN); Virendra Kumar Mehta, Cupertino, CA (US); Prakash Sathyanath Raghavendra, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1327 days.

(21) Appl. No.: 11/812,639

(22) Filed: Jun. 20, 2007

(65) Prior Publication Data

US 2008/0028179 A1    Jan. 31, 2008

(30) Foreign Application Priority Data

Jul. 28, 2006    (IN) .......................... 1331/CHE/2006

(51) Int. Cl.
*G06F 9/45* (2006.01)
*G06F 9/44* (2006.01)

(52) U.S. Cl.
USPC ............ 717/151; 717/114; 717/141; 717/154

(58) Field of Classification Search
None
See application file for complete search history.

(56) References Cited

U.S. PATENT DOCUMENTS

| | | | | |
|---|---|---|---|---|
| 6,665,865 B1 * | 12/2003 | Ruf | ................................ | 717/157 |
| 6,675,378 B1 * | 1/2004 | Schmidt | ........................ | 717/154 |
| 7,146,606 B2 * | 12/2006 | Mitchell et al. | ................ | 717/141 |
| 7,257,685 B2 * | 8/2007 | Tene et al. | ...................... | 711/154 |
| 7,308,680 B2 * | 12/2007 | Grover et al. | .................. | 717/114 |
| 7,451,438 B2 * | 11/2008 | Kielstra et al. | ................. | 717/154 |
| 2003/0188299 A1 * | 10/2003 | Broughton et al. | ........... | 717/141 |
| 2004/0015920 A1 * | 1/2004 | Schmidt | ......................... | 717/153 |
| 2005/0080980 A1 * | 4/2005 | Wu et al. | ............................ | 711/1 |
| 2005/0283771 A1 * | 12/2005 | Paller | ............................ | 717/151 |
| 2007/0250825 A1 * | 10/2007 | Hicks et al. | .................... | 717/151 |
| 2008/0288737 A1 * | 11/2008 | Zhuang et al. | ................. | 711/165 |

FOREIGN PATENT DOCUMENTS

| | | |
|---|---|---|
| JP | 06-075786 | 3/1994 |
| JP | H06-131313 | 5/1994 |
| JP | 07-141305 | 2/1995 |
| JP | H10-063525 | 3/1998 |
| JP | 2002-149481 | 5/2002 |
| JP | 2002-251321 | 6/2002 |

OTHER PUBLICATIONS

Choi et al., Stack allocation and synchronization optimizations for Java using escape analysis, Nov. 2003, 35 pages, <http://delivery.acm.org/10.1145/950000/945892/p876-choi.pdf>.*

(Continued)

*Primary Examiner* — Thuy Dao

(57) ABSTRACT

A technique for reducing non-local access, in dynamically generated code that resides in a code buffer of a non-uniform memory access computer system including multiple nodes, for improving overall performance of dynamic optimization systems. In one example embodiment, this is accomplished by partitioning the code buffer into multiple smaller code buffers and assigning each of the multiple smaller code buffers to one of the multiple nodes. Statically determining which methods in the generated code are executed by a thread and then to place those methods in associated one of the multiple smaller code buffers to reduce memory latencies introduced by non-local accesses.

18 Claims, 2 Drawing Sheets

OTHER PUBLICATIONS

Kotzmann et al., Escape analysis in the context of dynamic compilation and deoptimization, Jun. 2005, 10 pages, <http://delivery.acm.org/10.1145/1070000/1064996/p111-kotzmann.pdf>.*

Mu et al., Interactive locality optimization on NUMA architectures, Jun. 2003, 10 pages, <http://delivery.acm.org/10.1145/780000/774853/p133-mu.pdf>.*

Hazelwood et al., "Exploring Code Cache Eviction Granularities in Dynamic Optimization Systems," Second Annual IEEE/ACM International Symposium on code Generation and Optimization (CGO-04), Mar. 2004, pp. 89-99.

* cited by examiner

SYSTEM AND METHOD FOR RECOMPILING CODE BASED ON LOCALITY DOMAIN AND THREAD AFFINITY IN NUMA COMPUTER SYSTEMS

TECHNICAL FIELD OF THE INVENTION

The present invention relates generally to computer software, and more particularly relates to reallocating portions of a computer program for improved performance.

BACKGROUND OF THE INVENTION

Multiprocessor computer systems can be generally divided into two categories: systems with multiple processors either having a common shared memory and peripherals or having distributed memories and peripherals. Systems organized so that all processors have equal access to the peripheral devices and memories are known as symmetric multiprocessing (SMP) systems. The processors within an SMP system are connected to the shared memory and to each other via a common bus. A bus hierarchy may be used to connect the peripheral devices.

In non-uniform memory access ("NUMA") computer architecture, memory access latencies are allowed to differ depending on processor and memory locations. All processors in a NUMA computer system continue to share system memory but the time required to access memory varies, i.e., is non-uniform, based on the processor and memory location. The main advantage of NUMA SMP designs over other alternatives like UMA SMP designs is scalability. Further, programming on NUMA SMPs is as simple as programming on traditional SMP shared memory. As a result, NUMA computer systems can run existing SMP applications without modifications.

In a NUMA computer system where processors and system memory are organized into two or more clusters or locality domains, each locality domain can include one or more processors which communicate with the local memory by means of a local bus. Each locality domain also includes a bridge for interconnecting the locality domain with other locality domains by means of a communication channel in order to form a network of intercommunicating locality domains. In such a multinode multiprocessor computer system, performance of a particular processor is always best if it accesses memory from its own local locality domain rather than from a remote locality domain, because it only requires access to the local bus.

A determination of underlying architecture and memory access patterns of all locality domains in a multinode multiprocessor computer system and exploiting the knowledge to optimally place program and data on a NUMA machine, can lead to significant performance gains. The system firmware generally contains topology information for all the processors and memories present in a multi processor environment during system reboot. Such topology information identifies the locality domains—groups of processors and associated memories in the system. This enables a tight coupling between the processors and the memory ranges in a locality domain and the operating system can use such affinity information to determine the allocation of memory resources and the scheduling of software threads to improve the system performance.

Current optimization techniques use such affinity information to better use locality domains to reduce memory access latency. For example, most operating systems provide a way to lock an entire process within a locality domain so that all threads of a process are able to share a common pool of memory that provides a substantially low amount of latency. If a process requires spanning across locality domains, the current techniques provide better memory access to different threads by splitting the thread accessed locality domains into local domain memory segments. While these techniques address data handling, they do not address instruction handling. In addition, current techniques do not partition code buffer based on locality domain and/or thread affinity in NUMA computer systems using such affinity information.

SUMMARY OF THE INVENTION

According to an aspect of the subject matter, there is provided a method for improving instruction locality by splitting the code buffer for executable code in multiple locality domains, comprising the steps of partitioning the code buffer into multiple smaller code buffers, assigning each of the multiple smaller code buffers to one of the multiple nodes, performing escape analysis during compilation of methods, determining if there is any of the sets of threads associated with the methods that do not escape, and if so, placing the generated code associated with each of the sets of threads associated with the methods that do not escape in the associated partitioned multiple smaller code buffers that are assigned to the multiple nodes.

BRIEF DESCRIPTION OF THE DRAWINGS

Embodiments of the invention will now be described, by way of example only, with reference to the accompanying drawings in which.

DETAILED DESCRIPTION OF THE INVENTION

In the following detailed description of the various embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The term "thread" refers to independent paths of execution for a program. For example, for an e-commerce computer application, different threads might be assigned to different customers so that each customer's specific e-commerce transaction is handled in a separate thread. The discussion hereinafter will refer to the entities that are assigned to particular sets of resources as being "threads". It will be appreciated, however, that other terminology may be used to describe entities that define unique paths of execution in a computer system. As such, the term "thread" should be considered to correspond to any entity in a computer defining a particular execution path in a computer system.

A thread type within the context of the present subject matter may include practically any attribute or other distinguishing characteristic of a thread, including, but not limited to, run priority, assignment to the same virtual or physical buffer or memory, user identity, parent logical subsystem, job, application, task or thread, assignment to the same memory sub system, name of the initial program to be executed when thread started, thread authority, and user profile.

Also the terms "locality domain", "cluster", and "cell" are used interchangeably throughout the document.

The present technique divides methods present in generated code based on partitioned multiple smaller code buffers. It further groups the divided methods and associated sets of threads together into these partitioned multiple smaller code buffers. Furthermore, it associates the grouped methods and threads with assigned nodes. Basically, each method gets placed into one of the associated partitioned multiple smaller code buffers and the grouped thread executes on one of the associated multiple nodes. In addition, the present technique uses the online profile data to place the code generated from compilation of new methods or recompilation of existing methods such that the non-local accesses are minimized.

Figure 1:
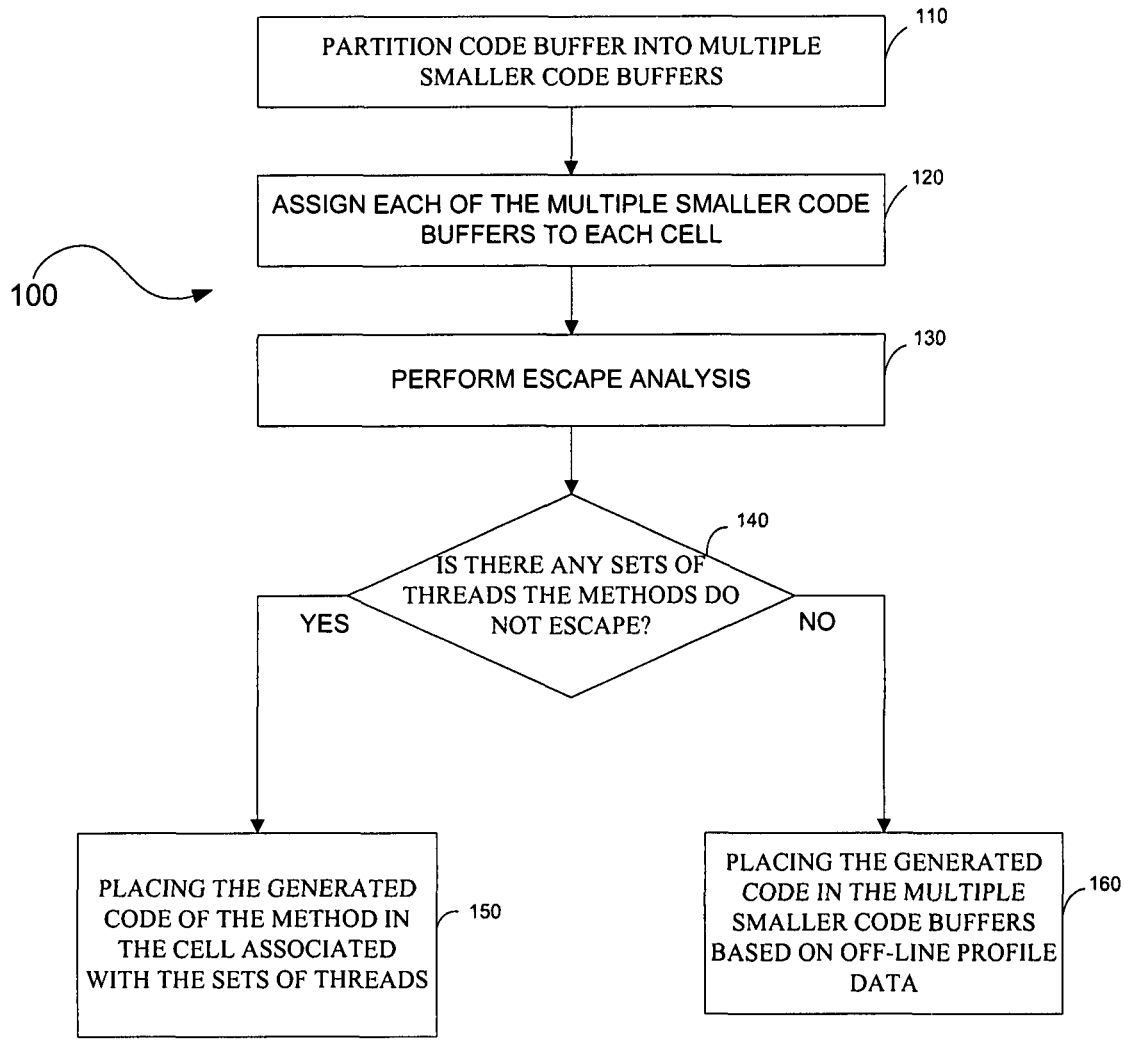
FIG. 1 is a flowchart illustrating a method for recompiling executable code to improve performance according to an embodiment of the present subject matter.

FIG. 1 illustrates an example method 100 of recompiling reducing non-local access for dynamically generated code residing in a code buffer in a NUMA computer system with multiple nodes. The dynamically generated code can be for JAVA methods, which is generated in smaller snippets and its access patterns can be determined by the run-time environment. For example, in a multi-threaded program, different threads may be doing different work and can be working with different JAVA methods. Also for example, if there are four cells in the NUMA computer system, the code buffer can be split into four associated parts (C1, C2, C3 and C4). At step 110, this example method 100 begins by partitioning the code buffer into multiple smaller code buffers. In some embodiments, generally known techniques, such as mmaps are used to partition the code buffer. In our running example, the four smaller buffers are assigned to their associated four different cells, i.e., placing them in corresponding CLMs (Cell Local Memories).

At step 120, each of the multiple smaller code buffers is assigned to an associated node in the multi-node NUMA computer system. In some embodiments, the size of each of the multiple smaller code buffers is determined based on off-line profile data. For example, for a typical application run, if we need about 40% of the code buffer in cell, C1, 20% each in C2, C3 and C4. Then, we can divide the code buffer into corresponding sizes and associate these smaller buffers with these corresponding cells.

At step 130, escape analysis is performed during compilation of methods in the generated code to find a method, or methods, that do not escape threads or sets of threads. Escape analysis is a static analysis that determines whether the lifetime of data may exceed its static scope. The escape analysis can also determine if an object can be allocated on the stack. Further the technique facilitates in determining if an object is accessed only by a single thread during its lifetime so that synchronization operations on that object can be removed.

In some embodiments, the methods refer to JAVA functions and/or procedures. The escape analysis information can be gathered by the compiler using well-known conventional techniques. The escape analysis information provides information, such as which objects can be allocated on a stack instead of on the heap, which set of instructions do not escape a thread, and so on; This information can be used to divide a set of hot methods and a set of threads such that each method falls into a non-escape set of a thread. For example, the escape analysis might tell us that a method, M, does not escape set of threads, T1 and T2. Then, we can place code generated from compilation of M only on the associated cell, to which threads T1 and T2 are tied (or on which cell the threads T1 and T2 run).

At step 140, the method 100 determines whether there are any methods that do not escape each of the sets of threads. Based on the determination at step 140, if there are methods that do not escape each of the sets of threads, the method 100 goes to step 150. At step 150, the generated code associated with the methods that do not escape each of the sets of threads is placed in the associated partitioned multiple smaller code buffers that are assigned to the multiple nodes.

Based on the determination at step 140, if there are no methods that do not escape each of the sets of threads, the method 100 goes to step 160. At step 160, the generated code associated with the methods that do not escape each of the sets of threads is placed in the multiple code buffers based on an off-line profile data. For example, if we cannot find any sets of threads which a method, M, does not escape, then we can place the code compiled for method, M, into CLMs of those cells, C1, C2, C3 and C4 as follows: From offline profile data, if it can be determined that the certain threads T1, T2, . . . Ti can access a certain set of methods M1, M2, . . . Mi frequently, then the thread set T1, T2 . . . Ti can be tied to a cell Ci and by placing the code compiled for that method set M1, M2, . . . Mi on to the associated cell Ci.

Generally, the off-line profile data includes the information per method, like, the number of invocations executed in interpreter mode of that method, the number of invocations executed in compilation mode of that method, total number of invocations of that method, average time taken for one invocation in interpreter mode of that method, average time taken for one invocation of compiled code of that method, the invocation count at the time it is sent to the compile request list, the method size (estimated from a cost analysis of the instructions in the method), the compilation time etc.

In some embodiments, newly or recompiled methods associated with sets of threads are periodically reassigned to associated multiple smaller code buffers based on online profile data. The online profile information is used to find instructions which suffer from remote memory misses during code cache accesses. This information helps in allocating code cache for each instruction such that the instructions are mapped on to the associated locality domain where the threads are schedule to run. In these embodiments, this information is also reported so that it can assist a programmer to use, for example, pset calls to tie the threads to the associated locality domain. The profiling information can also include data about the frequencies with which different execution paths in a program are traversed which can facilitate in determining the order in which instructions can be packaged. By discovering the "hot code" through a procedure, the instructions can be packed to those traces consecutively into cache lines, which can result in greater cache utilization and fewer cache misses. Thus, profile information can be used to reduce conflict misses in set-associate cache misses. In addition, the profiling information can assist in separate infrequently executed traces from the main procedure body for additional efficiency.

Generally, a hot code is run in an interpretation mode. As the interpreter executes, it gathers on-line profile data indicating which code sections are being executed frequently. These code sections are designated as "hot" code, and are compiled in a compilation mode into machine code. Thus, only code that is executed frequently is compiled. If the number of invocations of a code section is determined to be above a static hotness threshold, then the code section is compiled.

In some embodiments, the generated code residing in the assigned multiple smaller code buffers is invalidated upon periodically placing copies of the recompiled generated code in the associated multiple nodes for a predetermined number of times. In these embodiments, the predetermined number of times to place copies of the recompiled generated code is determined based on an empirical approach. In some embodiments, newly generated code is periodically placed in the associated multiple nodes based on on-line profile data.

In some embodiments, the steps of periodically invalidating the generated code residing in the assigned multiple smaller code buffers and placing copies of the recompiled generated code is repeated during a predefined event, such as the garbage collection event.

Although the flowchart 100 includes steps 110-140 that are arranged serially in the exemplary embodiments, other embodiments of the subject matter may execute two or more steps in parallel, using multiple processors or a single processor organized as two or more virtual machines or sub-processors. Moreover, still other embodiments may implement the steps as two or more specific interconnected hardware modules with related control and data signals communicated between and through the modules, or as portions of an application-specific integrated circuit. Thus, the exemplary process flow diagrams are applicable to software, firmware, and/or hardware implementations.

Although the embodiments of the present invention are described in the context of non-distributed environment they can be very much implemented in the distributed environment as well.

Various embodiments of the present subject matter can be implemented in software, which may be run in the environment shown in FIG. 2 (to be described below) or in any other suitable computing environment. The embodiments of the present subject matter are operable in a number of general-purpose or special-purpose computing environments. Some computing environments include personal computers, general-purpose computers, server computers, hand-held devices (including, but not limited to, telephones and personal digital assistants (PDAs) of all types), laptop devices, multi-processors, microprocessors, set-top boxes, programmable consumer electronics, network computers, minicomputers, mainframe computers, distributed computing environments and the like to execute code stored on a computer-readable medium. The embodiments of the present subject matter may be implemented in part or in whole as machine-executable instructions, such as program modules that are executed by a computer. Generally, program modules include routines, programs, objects, components, data structures, and the like to perform particular tasks or to implement particular abstract data types. In a distributed computing environment, program modules may be located in local or remote storage devices.

Figure 2:
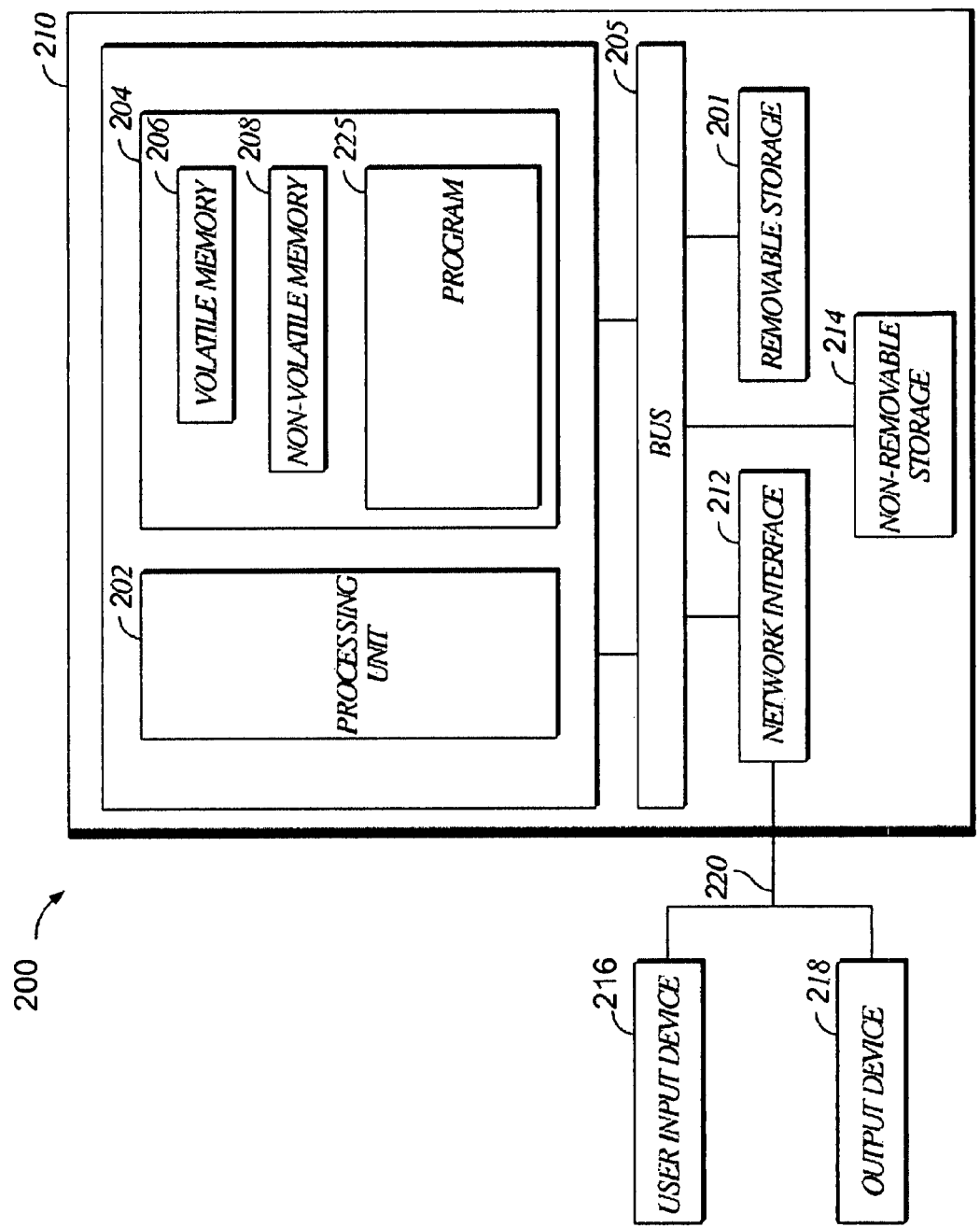
FIG. 2 is a block diagram of a typical computer system used for implementing embodiments of the present subject matter shown in FIG. 1.

FIG. 2 shows an example of a suitable computing system environment for implementing embodiments of the present subject matter. FIG. 2 and the following discussion are intended to provide a brief, general description of a suitable computing environment in which certain embodiments of the inventive concepts contained herein may be implemented.

A general computing device, in the form of a computer 210, may include a processor 202, memory 204, removable storage 201, and non-removable storage 214. Computer 210 additionally includes a bus 205 and a network interface 212.

Computer 210 may include or have access to a computing environment that includes one or more user input modules 216, one or more output modules 218, and one or more communication connections 220 such as a network interface card or a USB connection. The one or more output devices 218 can be a display device of computer, computer monitor, TV screen, plasma display, LCD display, display on a digitizer, display on an electronic tablet, and the like. The computer 210 may operate in a networked environment using the communication connection 220 to connect to one or more remote computers. A remote computer may include a personal computer, server, router, network PC, a peer device or other network node, and/or the like. The communication connection may include a Local Area Network (LAN), a Wide Area Network (WAN), and/or other networks.

The memory 204 may include volatile memory 206 and non-volatile memory 208. A variety of computer-readable media may be stored in and accessed from the memory elements of computer 210, such as volatile memory 206 and non-volatile memory 208, removable storage 201 and non-removable storage 214. Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like; chemical storage; biological storage; and other types of data storage.

"Processor" or "processing unit," as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, application programs, etc., for performing tasks, or defining abstract data types or low-level hardware contexts.

Machine-readable instructions stored on any of the above-mentioned storage media are executable by the processing unit 202 of the computer 210. For example, a program module 225 may include machine-readable instructions capable of reducing non-local access for dynamically generated code residing in a code buffer in a NUMA computer system including multiple nodes to improve performance according to the teachings and herein described embodiments of the present subject matter. In one embodiment, the program module 225 may be included on a CD-ROM and loaded from the CD-ROM to a hard drive in non-volatile memory 208. The machine-readable instructions cause the computer 210 to encode according to the various embodiments of the present subject matter.

The operation of the computer system 200 for recompiling executable code to improve performance is explained in more detail with reference to FIG. 1. The above-described technique uses escape analysis information obtained from a compiler to segment executable code buffer for cell based systems, such as NUMA computer systems. The above technique proposes persistent code cache schemes on a per locality basis for processes having high thread affinity. Further, the above technique reduces synchronization overhead of a shared code cache (i.e., in multiple compiler threads in high speed java virtual machines (JVMs), as opposed to each thread executing the code by itself doing the translation as in a JIT (just-in-time compilation) can be reduced. A JIT compiler converts all byte codes into machine code before execution, but only compiles a code path when it knows that the code path is about to be executed.

The above-described process improves performance by reducing remote memory code buffer misses for dynamic optimization systems that include cell local memory as well as blade servers. Further, the above technique uses escape analysis information obtained from the compiler for segmenting the code buffer for Cell Local Memory (CLM) based systems.

Although, the above example embodiments shown in FIGS. 1-2 are explained with reference to JVM and NUMA computer systems, the above-described technique is not limited to only JVM and NUMA computer systems, but it can be used within any executable code on any computer system to reduce remote memory code buffer misses to improve performance.

The above technique can be implemented using an apparatus controlled by a processor where the processor is provided with instructions in the form of a computer program constituting an aspect of the above technique. Such a computer program may be stored in storage medium as computer readable instructions so that the storage medium constitutes a further aspect of the present subject matter.

The above description is intended to be illustrative, and not restrictive. Many other embodiments will be apparent to those skilled in the art. The scope of the subject matter should therefore be determined by the appended claims, along with the full scope of equivalents to which such claims are entitled.

As shown herein, the present subject matter can be implemented in a number of different embodiments, including various methods, a circuit, an I/O device, a system, and an article comprising a machine-accessible medium having associated instructions.

Other embodiments will be readily apparent to those of ordinary skill in the art. The elements, algorithms, and sequence of operations can all be varied to suit particular requirements. The operations described-above with respect to the method illustrated in FIG. 1 can be performed in a different order from those shown and described herein.

FIGS. 1-2 are merely representational and are not drawn to scale. Certain proportions thereof may be exaggerated, while others may be minimized. FIGS. 1-2 illustrate various embodiments of the subject matter that can be understood and appropriately carried out by those of ordinary skill in the art.

In the foregoing detailed description of the embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive invention lies in less than all features of a single disclosed embodiment. Thus the following claims are hereby incorporated into the detailed description of the embodiments of the invention, with each claim standing on its own as a separate preferred embodiment.

The invention claimed is:
1. A method, executed by one or more processors, for reducing non-local access for dynamically generated code residing in a code buffer in a non-uniform memory access ("NUMA") computer system including multiple nodes, comprising:
  partitioning the code buffer into multiple smaller code buffers;
  assigning each of the multiple smaller code buffers to one of the multiple nodes;
  performing escape analysis during compilation of methods;
  determining if there are any methods that do not escape the associated sets of threads based on the escape analysis, a thread defining a particular execution path in a computer system;
  if so, placing the generated code associated with the methods and the sets of threads in the associated partitioned multiple smaller code buffers that are assigned to the multiple nodes;
  if the methods escape, placing the generated code associated with the methods and the sets of threads in the multiple smaller code buffers based on off-line profile data selected from a group consisting of the number of invocations executed in interpreter mode of the methods, the number of invocations executed in compilation mode of the methods, total number of invocations of the methods, average time taken for one invocation in interpreter mode of the methods, average time taken for one invocation of compiled code of the methods, the invocation count at the time it is sent to the compile request list, the method size estimated from a cost analysis of the instructions in the methods and compilation time;
  determining if an object is accessed only by a single thread during the object's lifetime; and
  if so, removing synchronization operations on the object.

2. The method of claim 1, further comprising:
  periodically reassigning newly or recompiled generated code associated with sets of threads to associated multiple smaller coder buffers that are assigned to the multiple nodes based on on-line profile data used to find instructions that miss remote memory during code cache access.

3. The method of claim 2, further comprising:
  invalidating generated code residing in the associated multiple smaller code buffers upon periodically placing copies of the recompiled generated code in the associated multiple nodes for a predetermined number of times.

4. The method of claim 3, further comprising:
  periodically placing newly generated code in the associated multiple nodes based on the on-line profile data.

5. The method of claim 2, further comprising:
  repeating the steps of periodically placing and invalidating during a predefined event.

6. The method of claim 1, further comprising:
  determining size of each of the multiple smaller code buffers based on off-line profile data.

7. An article comprising:
  a non-transitory storage medium having instructions, that when executed by a computing platform, result in execution of a method for reducing non-local access for dynamically generated code residing in a code buffer in a non-uniform memory access ("NUMA") computer system including multiple nodes comprising:
  partitioning the code buffer into multiple smaller code buffers;
  assigning each of the multiple smaller code buffers to one of the multiple nodes;
  performing escape analysis during compilation of methods;

determining if there is any methods that do not escape the associated sets of threads based on the escape analysis, a thread defining a particular execution path in a computer system;

if so, placing the generated code associated with the and the sets of threads in the associated partitioned multiple smaller code buffers that are assigned to the multiple nodes;

if the methods escape, placing the generated code associated with the methods and the sets of threads in the multiple smaller code buffers based on off-line profile data selected from a group consisting of the number of invocations executed in interpreter mode of the methods, the number of invocations executed in compilation mode of the methods, total number of invocations of the methods, average time taken for one invocation in interpreter mode of the methods, average time taken for one invocation of compiled code of the methods, the invocation count at the time it is sent to the compile request list, the method size estimated from a cost analysis of the instructions in the methods and compilation time;

determining if an object is accessed only by a single thread during the object's lifetime; and if so, removing synchronization operations on the object.

8. The article of claim 7, further comprising:
periodically reassigning newly or recompiled generated code associated with sets of threads to associated multiple smaller coder buffers that are assigned to the multiple nodes based on on-line profile data used to find instructions that miss remote memory during code cache access.

9. The article of claim 8, further comprising:
invalidating generated code residing in the associated multiple smaller code buffers upon periodically placing copies of the recompiled generated code in the associated multiple nodes for a predetermined number of times.

10. The article of claim 9, further comprising:
periodically placing newly generated code in the associated multiple nodes based on the on-line profile data.

11. The article of claim 9, further comprising:
repeating the steps of periodically placing and invalidating during a predefined event.

12. The article of claim 7, further comprising:
determining size of each of the multiple smaller code buffers based on off-line profile data.

13. A computer system comprising:
a computer network, wherein the computer network has a plurality of network elements, and wherein the plurality of network elements has a plurality of network interfaces;
a network interface;
an input module coupled to the network interface that receives generated code via the network interface;
a processor; and
a memory coupled to the processor, the memory having stored therein code associated with reducing non-local access for dynamically generated code residing in a code buffer in a non-uniform memory access ("NUMA") computer system including multiple nodes, the code causes the processor to perform a method comprising:

partitioning the code buffer into multiple smaller code buffers;

assigning each of the multiple smaller code buffers to one of the multiple nodes;

performing escape analysis during compilation of methods;

determining if there is any methods that do not escape the associated sets of threads based on the escape analysis, a thread defining a particular execution path in a computer system;

if so, placing the generated code associated with the methods and the sets of threads in the associated partitioned multiple smaller code buffers that are assigned to the multiple nodes;

if the methods escape, placing the generated code associated with the methods and the sets of threads in the multiple smaller code buffers based on off-line profile data selected from a group consisting of the number of invocations executed in interpreter mode of the methods, the number of invocations executed in compilation mode of the methods, total number of invocations of the methods, average time taken for one invocation in interpreter mode of the methods, average time taken for one invocation of compiled code of the methods, the invocation count at the time it is sent to the compile request list, the method size estimated from a cost analysis of the instructions in the methods and compilation time;

determining if an object is accessed only by a single thread during the object's lifetime; and if so, removing synchronization operations on the object.

14. The system of claim 13, further comprising:
periodically reassigning newly or recompiled generated code associated with sets of threads to associated multiple smaller coder buffers that are assigned to the multiple nodes based on on-line profile data used to find instructions that miss remote memory during code cache access.

15. The system of claim 14, further comprising:
invalidating generated code residing in the associated multiple smaller code buffers upon periodically placing copies of the recompiled generated code in the associated multiple nodes for a predetermined number of times.

16. The system of claim 15, further comprising:
periodically placing newly generated code in the associated multiple nodes based on the on-line profile data.

17. The system of claim 15, further comprising:
repeating the steps of periodically placing and invalidating during a predefined event.

18. The system of claim 15, further comprising:
determining size of each of the multiple smaller code buffers based on off-line profile data.

* * * * *

UNITED STATES PATENT AND TRADEMARK OFFICE
CERTIFICATE OF CORRECTION

PATENT NO. : 8,453,132 B2  
APPLICATION NO. : 11/812639  
DATED : May 28, 2013  
INVENTOR(S) : Mannarswamy et al.

Page 1 of 1

It is certified that error appears in the above-identified patent and that said Letters Patent is hereby corrected as shown below:

In the Claims

Column 10, line 55, Claim 18, delete "claim 15," and insert -- claim 13, --, therefor.

Signed and Sealed this  
Sixteenth Day of September, 2014

Michelle K. Lee  
*Deputy Director of the United States Patent and Trademark Office*